United States Patent [19]

Kim

[11] 4,134,288
[45] Jan. 16, 1979

[54] LIQUID METER PROVER APPARATUS

[75] Inventor: Kee W. Kim, Houston, Tex.

[73] Assignee: Daniel Valve Company, Houston, Tex.

[21] Appl. No.: 842,299

[22] Filed: Oct. 14, 1977

[51] Int. Cl.² ............................................. G01F 25/00
[52] U.S. Cl. ................................................................. 73/3
[58] Field of Search ........................ 73/3; 251/210, 324

[56] References Cited

U.S. PATENT DOCUMENTS

| | | | |
|---|---|---|---|
| 2,659,566 | 11/1953 | Rand | 251/324 |
| 2,690,322 | 9/1954 | Stansfield | 251/324 |
| 3,911,724 | 10/1975 | Grove | 73/3 |
| 3,969,924 | 7/1976 | Grove | 251/324 |

Primary Examiner—S. Clement Swisher
Attorney, Agent, or Firm—James L. Jackson

[57] ABSTRACT

Apparatus comprising an interchange which receives a sphere from a meter prover loop after a meter prover run and which launches the sphere into the loop to commence a run. An assembly within the body of the interchange is movable between sphere receiving and sphere launching positions. When in sphere launching position it provides a seal which prevents flow through the interchange. Means is incorporated which prevents hydraulic shock when the assembly is moved from sphere receiving to sphere launching position. Also the apparatus has improved means for detecting leakage.

7 Claims, 9 Drawing Figures

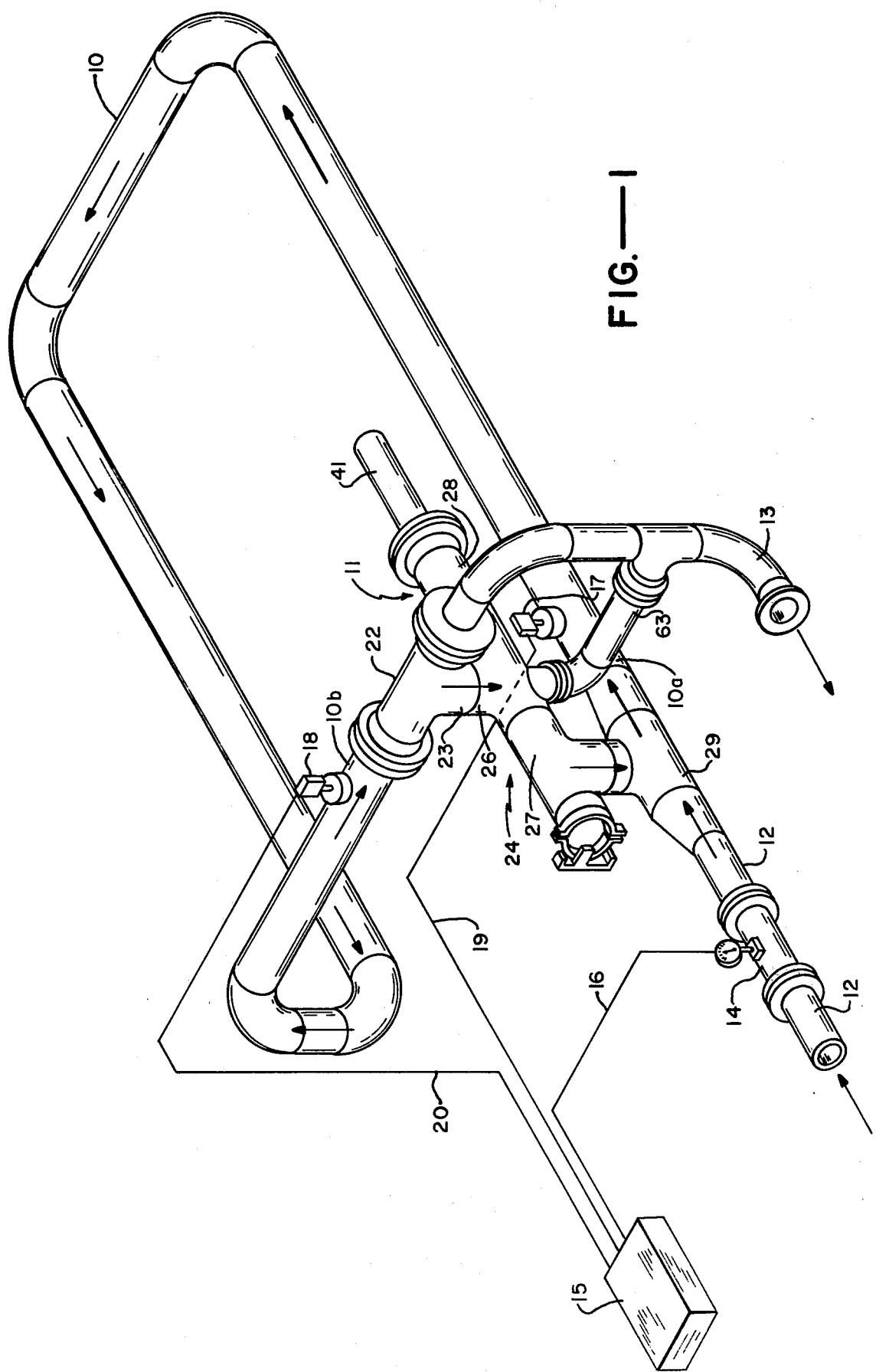
FIG.—1

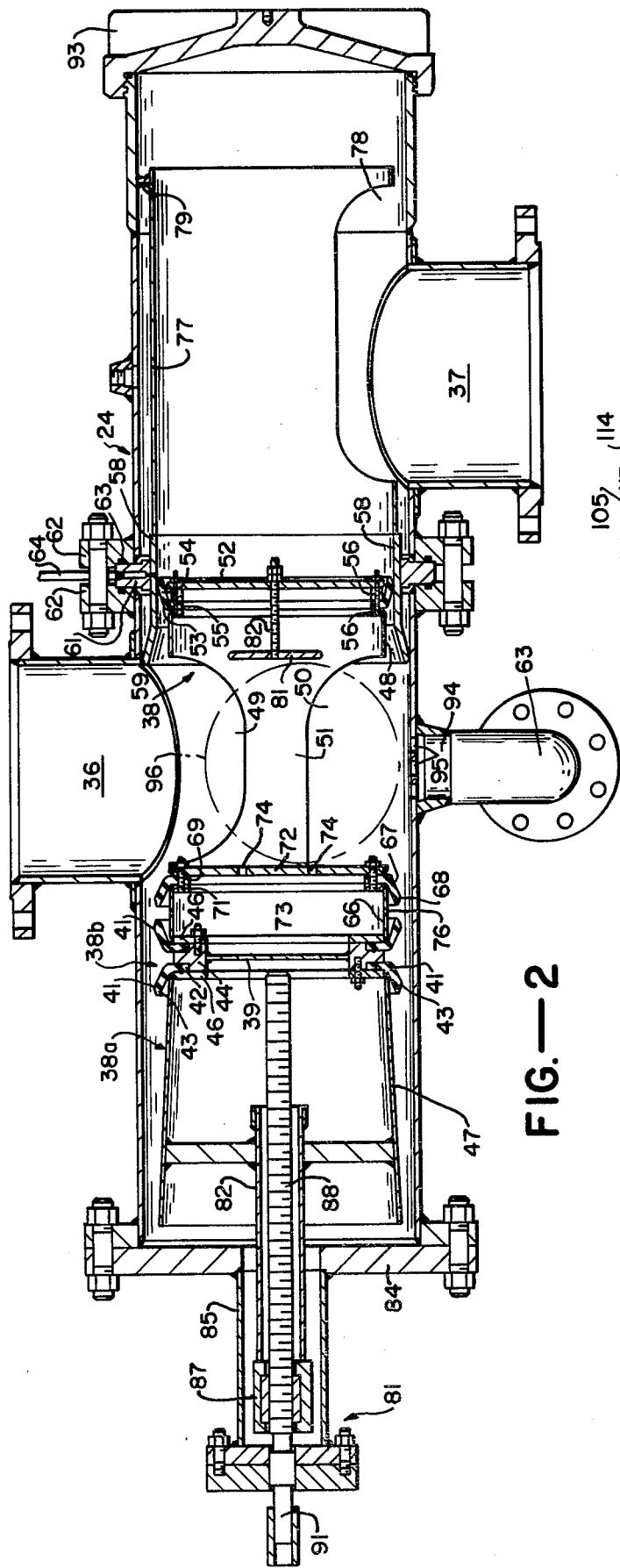
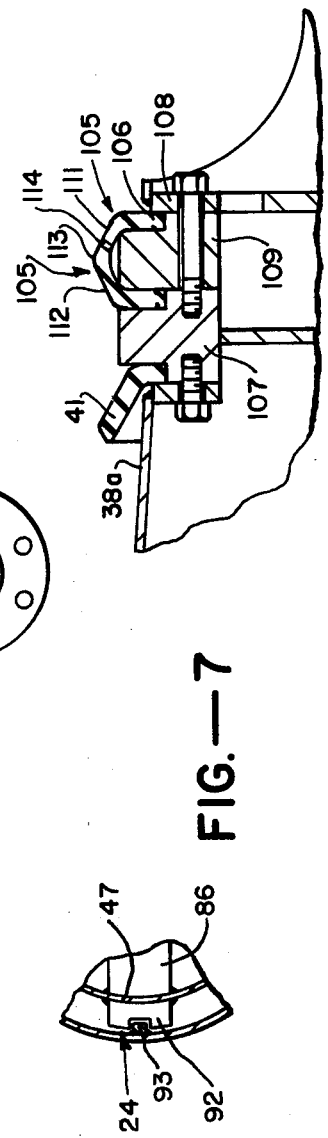
FIG.—2
FIG.—7
FIG.—8

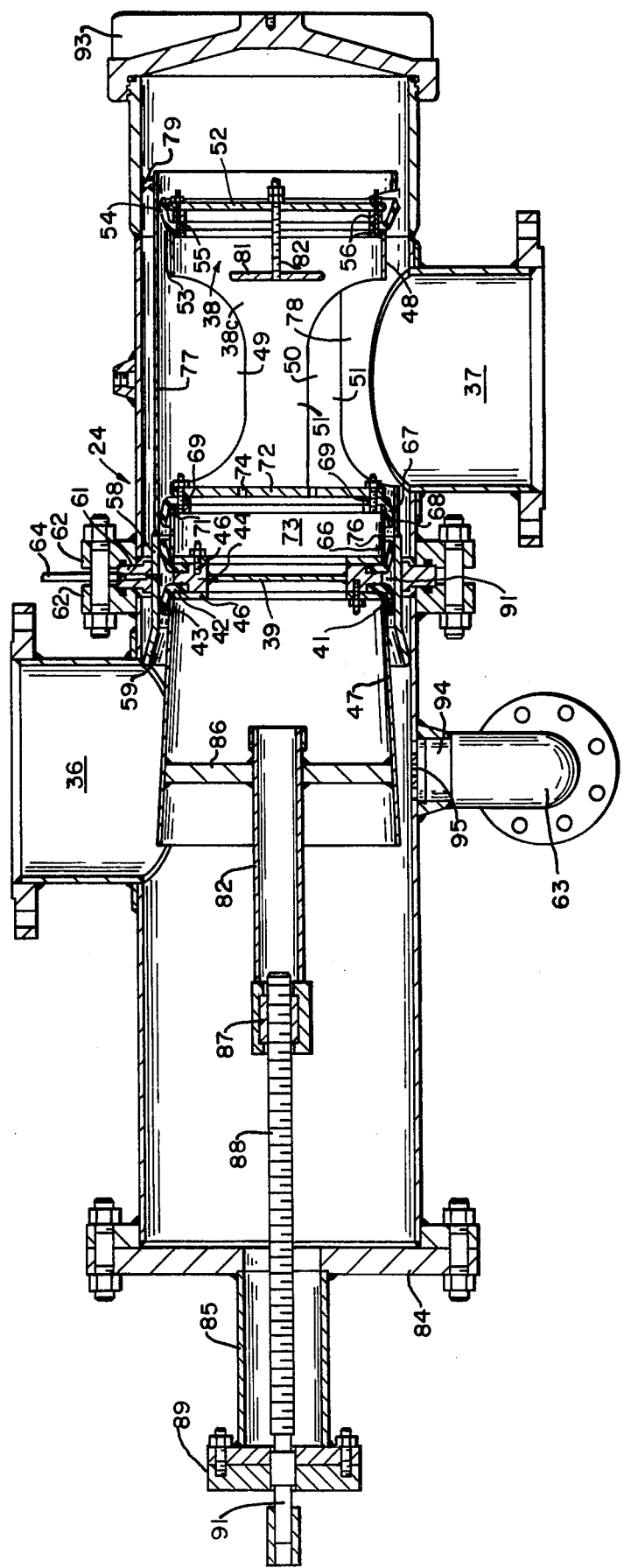
FIG.—3

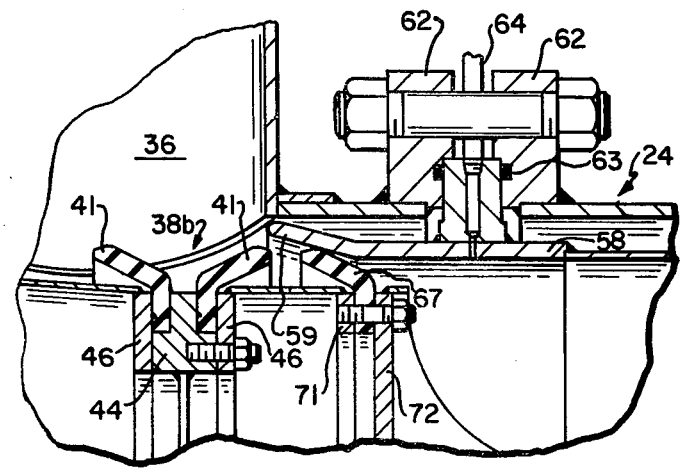
FIG.—4
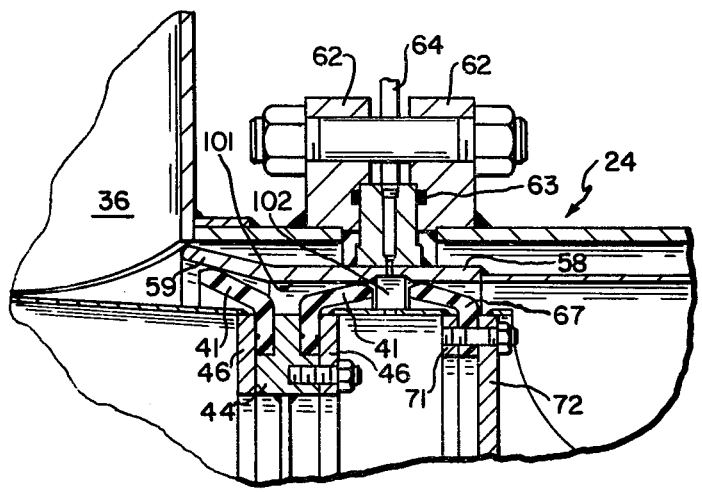
FIG.—5
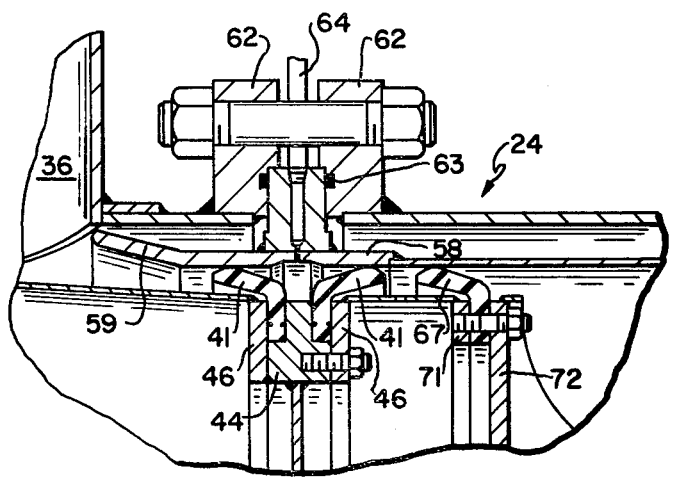
FIG.—6

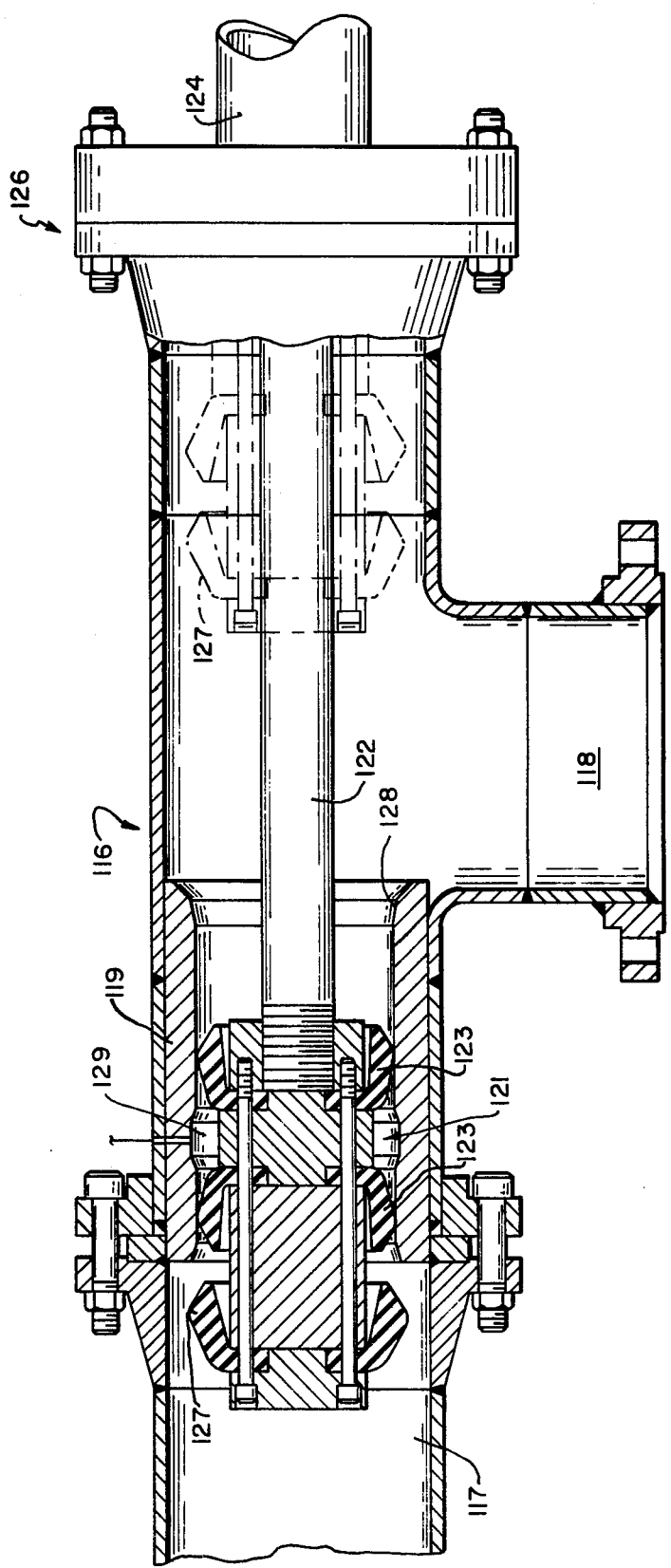
FIG.—9

LIQUID METER PROVER APPARATUS

BACKGROUND OF THE INVENTION

The invention relates generally to meter prover apparatus and particularly to interchanges used in such apparatus for receiving a sphere from the meter prover loop, and for relaunching the sphere into the loop.

U.S. Pat. No. 3,911,724 dated Oct. 14, 1975 discloses meter prover apparatus incorporating an interchange which receives a sphere from the outlet end of the metering loop and causes it to be launched into the inlet end of the loop to commence a meter prover run. It consists of a shuttle assembly disposed within the interchange body and movable between sphere receiving and sphere launching positions. When in sphere launching position, means is provided for establishing a seal which prevents flow through the interchange. In addition to incorporating sealing means and a sphere carrier, the assembly is provided with means which prevents substantial backflow of liquid through the interchange when the shuttle assembly is in sphere receiving position. An improved interchange of the same type is disclosed in U.S. Pat. No. 3,998,089 dated Dec. 21, 1976. The improvement consists in providing backflow preventing means which establishes an interchange seal when the shuttle assembly is in sphere receiving position. Another feature is the means which guides the shuttle assembly to prevent misalignment. In the operation of interchanges of the type disclosed in the above patents, it has been found that under certain conditions hydraulic shock occurs when the shuttle assembly is moved from sphere receiving to launching positions. This shock appears to be due to abrupt sealing action of the sealing means carried by the shuttle assembly as the assembly is moved toward launching position. It tends to be more intense for higher flow rates and for interchanges made in the larger sizes. Such shocks are considered to be detrimental, particularly in that associated equipment components may be injured, and injury may occur to associated pipe connections.

OBJECTS OF THE INVENTION AND SUMMARY

In general it is an object of the invention to improve upon meter prover apparatus of the type disclosed in said U.S. Pat. Nos. 3,911,724 and 3,998,089.

More specifically, it is an object of the invention to improve upon such meter provers by incorporating means which prevents objectionable hydraulic shock.

Another object is to provide an improved shuttle assembly for meter prover interchanges which incorporates means for preventing hydraulic shock in addition to means which provides means to prevent flow through the interchange during a meter prover run.

Another object is to provide a meter prover interchange with improved means for detecting leakage.

In general the invention consists of an interchange body having openings for receiving a sphere from a metering pipe loop and for delivering it into the inlet end of the loop. A shuttle assembly disposed within the body includes a sphere carrier which receives a sphere and which when the shuttle assembly is moved to sphere launching position causes it to move out of the interchange body. The shuttle assembly also includes sealing means which prevents flow through the interchange body when the shuttle assembly is in its launching position. Means is provided for preventing hydraulic shock when the shuttle assembly is moved to launching position. The sealing means consists of a cylindrical sleeve carried by the interchange body and adapted to have sealing engagement with resilient sealing means carried by the shuttle assembly. The means for preventing shock in its preferred form consists of a resilient member carried by the shuttle assembly and engageable with the cylindrical sleeve when the assembly is moved toward launching position and before the sealing means engages the sleeve.

Further objects and features of the preferred embodiments are set forth in the following description in conjunction with the accompanying drawing.

BRIEF DESCRIPTION OF THE DRAWING

FIG. 1 is a perspective view illustrating a meter prover incorporating the invention.

FIG. 2 is a side elevational view in section illustrating the interchange incorporated in the apparatus of FIG. 1.

FIG. 3 is a side elevational view in section like FIG. 2 but showing the inner shuttle assembly in sphere launching position.

FIG. 4 is a detail in section illustrating the hydraulic shock preventing means entering the sleeve which forms a part of the interchange sealing means.

FIG. 5 is a detail illustrating means for increasing the self-induced pressure drop between the resilient seal means.

FIG. 6 is a detail like FIG. 5 but showing the parts in a different operating position.

FIG. 7 is a detail showing means for preventing rotation of the shuttle assembly.

DESCRIPTION OF THE PREFERRED EMBODIMENTS

The unidirectional prover shown in FIG. 1 consists of a meter proving pipe loop 10 having inlet and outlet portions 10a and 10b. The inlet and outlet portions are connected by the interchange 11 which serves to receive each sphere at the end of a meter proving run, and which transports and relaunches the sphere into the inlet portion 10a when it is desired to commence a new run. Upstream pipe 12 supplies liquid from the main line to the meter prover, and the downstream pipe 13 returns the liquid back to the main line. A flow meter 14, such as one of the turbine type, is shown interposed in line 12. The meter proves serves to make flow rate determinations which can be used for calibrating or correcting the readings of meter 14. It is customary to employ a flow meter having means for generating electrical pulses, the frequency of which is in direct proportion to the rate of flow through the meter body. Suitable means such as an electronic counter 15 is shown connected to the meter 14 by cable 16, and serves to provide flow readings. Sphere detectors 17 and 18 are located in the inlet and outlet portions of the pipe loop 10. They are shown connected to the counter 15 by cables 19 and 20, whereby controlling start and stop impulses are supplied to the counter. The mode of operation of such equipment is as follows. Assuming that a sphere is launched into the inlet 10a of the metering loop, it is flow propelled through the loop and past the detectors 17 and 18, thus applying start and stop pulses to the counter. The counter reading thus obtained can be used to check the accuracy of the flow meter 14, because the volume of the meter prover loop between the detecting points 17 and 18 is known. The improvements of the present invention are incorporated in the interchange 11. The outlet end portion 10b of the metering pipe is shown connected to a flow-tee 22 which has a downwardly extending portion 23 coupled to the interchange body 24. Also the body of the interchange is coupled to an underlying tee 29. The inlet end 10a of the metering pipe and the line 12 are connected to the aligned flow passages of tee 29. This tee can be provided with suitable means such as inclined bars, as disclosed in U.S. Pat. No. 3,998,089, to deflect a sphere into the metering pipe.

Referring to the interchange shown in FIG. 2, the body 24 is annular in transverse section and is provided with a side inflow opening 36 which is in communication with the downward extension 23 of tee 22, and also an outflow opening 37 which connects with the tee 29. Preferably the interchange is mounted horizontally whereby a sphere moves downwardly by gravity through the opening 36 and also downwardly by gravity from the interchange through the opening 37.

Within the body 24 there is a shuttle assembly 38 which is movable axially of the body between sphere receiving and sphere launching positions. The assembly includes a portion 38a which forms guard means to prevent a sphere from entering the interchange body when the assembly is in sphere receiving position. The sealing assembly 38b consists of a plate 39 which carries annular mounting means for the resilient sealing members 41. Each of these members is formed of suitable resilient material such as a suitable synthetic rubber or elastomer, and preferably consists of a base portion 42 together with an integral annular rim portion 43. The mounting means can consist of an annular member 44 which is secured to the perimeter of plate 39 as by welding, and which is provided with recesses for accommodating the base portions 42. Annular clamping members 46 engage the outer surfaces of the base portions 42 and are secured to the member 44 by suitable means, such as screws or bolts, thus providing seals between each of the resilient sealing members and the mounting means. The rims 41 when relaxed form substantially truncated cones, as illustrated in FIG. 2.

The guard 38a can consist of a shell 47, which is shown as a truncated cone, with its smaller end secured as by welding to the corresponding clamping member 46. When the shuttle assembly is in sphere launching position the shell 47 is directly within the area of the inlet opening 36, and thus blocks entry of a sphere into the interchange body.

The sphere carrier 38c can consist of a shell 48 that is generally annular and which is carried on that end of the shuttle assembly which is nearest the outlet opening 37. The upper and lower sides of the shell 48 are cut away as indicated at 49 and 50, thereby forming openings through which a sphere may pass. The side portions 51 of the carrier are spaced apart a distance greater than the diameter of the sphere and serve to loosely retain a sphere in general alignment with the axis of the interchange body.

A plate 52 is mounted upon the free end of the carrier 38c. Also the free end of the carrier is provided with the member 53 of resilient material, such as a suitable synthetic rubber or elastomer. The configuration of this member is such that it has an annular rim 54 and a base portion 55, the latter being mounted by the clamping rings 56. The rim 54 is faced toward the outlet opening 37, and the mounting means provides a seal between the member 53 and the plate 52. The plate 52 together with the resilient member 53 forms backflow preventing means, as will be presently explained.

Within the body and between the openings 36 and 37 there is a cylindrical sleeve 58. That end of the sleeve nearest the inlet opening 36 has a divergent portion 59. It is mounted within the body by suitable means, such as an annular member 61 which has its inner periphery secured to the sleeve by suitable means such as welding, and which is clamped between the body coupling flanges 62. Suitable sealing means 63, such as seals of the O-ring type, prevent leakage past the annular member 61. As will be presently explained, for the purpose of leak detection the member 61 is shown provided with a duct connected with the external pipe 64, which may connect with a pressure responsive device.

Extending between the sealing assembly of the shuttle assembly and the sphere carrier 38c, there is a shell extension 66 which is cylindrical and which at its one end is suitably secured to the mounting means for the sealing assembly, as for example, by welding to the annular clamping member 46. The other end of the shell extension 66 carries a member 67 formed of resilient material such as synthetic rubber or elastomer, which in configuration is similar to the sealing members 41. Thus member 67 has an annular rim 68 and a base portion 69 which is clamped between the annular ring 71 and the periphery of plate 72. For securing this mounting to the sleeve extension 66, the corresponding end of the extension may be welded to the perimeter of ring 71. The plate 72 is provided with one or more pressure equalizing openings 74. Also the shell extension 66 is provided with one or more pressure equalizing openings 76.

An annular shell 77, having a lower opening 78, is secured as by welding to the sleeve 58. It is attached by lug 79 to the body and serves to guide the carrier 38c.

The free end of the carrier 38c is shown provided with an abutment 81 which effectively limits the length of the sphere receiving cavity. This abutment is shown carried by the threaded rod 82, which is adjustable with respect to the plate 52.

One end of the interchange body is provided with closure plate 84 which serves to mount the yoke pipe 85. The particular operating means illustrated consists of a spider 86 which is secured as by welding to the guard shell 47, and which is also secured to the tube 82. This tube extends through the closure plate 84 and is provided with a nut 87 which engages the threaded stem 88. The stem extends through the bonnet assembly 89, which incorporates sealing means and a thrust bearing, and its outer end 91 is mechanically connected to suitable power operating means, which may consist of a suitable gear reduction and an electrical, pneumatic or hydraulic motor.

Means is provided for preventing rotation of the shuttle assembly when the operating stem 91 is rotated. Thus slotted lugs 92 (FIG. 7) are shown welded to the sides of the shell 47 and are slidably engaged with guide ribs 93 that are secured as by welding to the sides of the body.

The other end of the interchange body is provided with the removable closure 93.

It is desirable to provide an opening 94 in the lower side of the interchange body and directly below the inlet opening 36. It is provided with a grid 95 to block entrance of a sphere, and is connected with pipe 63 as illustrated in FIG. 1. This pipe serves as a bypass and to provide a downward flow between the openings 36 and 94 which aids in movement of incoming spheres into the body.

Operation of the interchange described above is as follows. For the sphere receiving position of the shuttle assembly shown in FIG. 2, the sphere after being received through the opening 36 takes the position shown at 96 in dotted lines. At this time the resilient member 53 mounted upon the free end of the sphere carrier is in engagement with the cylindrical sleeve 58, and therefore no substantial backflow can take place between openings 37 and 36. The engagement of member 53 with sleeve 58 need not establish a complete seal and small openings may be provided in member 52 to permit restricted communication between passages 36 and 37 for the sphere receiving position shown in FIG. 2.

When it is desired to launch a sphere, the shuttle assembly is moved toward the right from the position shown in FIG. 2 to the sphere launching position shown in FIG. 3. When in the sphere launching position, the sphere is brought to a position directly above the opening 37, and it is then permitted to move downwardly by gravity. As the shuttle assembly moves toward the launching position shown in FIG. 3 the resilient member 53 moves out of sealing relation with the sleeve 58, and to a position where a position of its periphery is exposed to the opening 78 in the guide shell 77. Therefore, for the last part of movement of the shuttle assembly to launching position, the resilient member 53 does not provide a seal to prevent backflow from opening 37 through the sleeve to the inflow opening 36. In the absence of the resilient member 67, the right hand one of the sealing members 41 would engage the entrant portion 59 of the sleeve 58, and thus abruptly establish an interchange seal. Assuming that a differential pressure existed between the openings 37 and 36 such as to maintain some backflow, an abrupt seal established by the first sealing member 41 would cause hydraulic shock. With the present improvement, before such an abrupt seal is formed, the resilient member 67 comes into proximity with the entrant portion 59 of the sleeve 58, and as it proceeds to a position in which it is contracted and in engagement with the inner cylindrical periphery of the sleeve, there is a gradual blockage which reduces the backflow gradually and thus prevents hydraulic shock. It will be noted that the resilient member 67 cannot establish a seal of itself because some flow can occur through the vents 74 and 76. However, any such flow is attenuated and is not of itself sufficient to cause hydraulic shock when the first one of the sealing members 41 engages the sleeve 58. The condition described above, namely the entrance of the resilient member 67 into the entrant portions 59 of the sleeve 58, is illustrated in FIG. 4.

With reference to the pipe 64, it communicates with the closed space 91 which exists between the sealing members 41 for the launching position shown in FIG. 3. By virtue of the principles disclosed and claimed in U.S. Pat. No. 3,827,285, dated Aug. 6, 1974, as the sealing members 41 successively enter the cylindrical portion of the sleeve 58, with flexing action, a substantial pressure drop is induced in the closed space between the sealing members, and this can be indicated by a pressure responsive device connected to the pipe 64. This can be a differential pressure responsive device such as a differential pressure operated electrical switch which is responsive to the differential pressure existing in the line and in the closed space between the sealing members.

Under certain conditions the amount of pressure drop induced in the closed space 91 when the sealing assembly is moved within the sleeve 58 would not be sufficient for reliable pressure indication. A greater self-induced pressure drop can be developed by making use of the invention disclosed and claimed in copending application Ser. No. 813,639, filed July 7, 1977, and illustrated in the embodiment of FIGS. 5 and 6. In this embodiment the sleeve 101 and the adjacent part of the body have been extended somewhat and a shallow annular groove 102 has been provided in the inner periphery of the sleeve. This groove is of such dimensions that its bottom surface a has a diameter which is less than the relaxed diameter of the sealing members 41. For the initial movement of the sealing assembly into the sleeve, the parts may occupy the position shown in FIG. 5. Here the sealing members 41 are in engagement with the sleeve 101, and the advancing sealing member 41 is about to enter the groove 102. With further movement, the advancing sealing member 41 enters the groove 102 and sweeps across the same, maintaining its sealing contact with the sleeve. As the sealing assembly reaches the position shown in FIG. 6, the increased volume represented by the groove 102 is now a part of the closed space between the sealing members, and as a result, the rims of the sealing members are stressed and urged with increased differential fluid pressure against the cylindrical surface of the sleeve 101, and the pressure within the closed space is less than the pressure which existed for the position shown in FIG. 5. This increased pressure drop can be indicated or measured by a pressure responsive device connected to the pipe 64.

The resilient member 67 described above has a rim portion with a free edge, and is used together with the two sealing members 41. In place of such an assembly, a member 105 which in radial section is U-shaped may be used with a single cup shaped sealing member 41. Thus in FIG. 8 a U-shaped member 105 made of resilient material is employed and is mounted in spaced relationship with the sealing member 41. It consists of annular base portions 106 mounted by the annular clamping members 107, 108 and 109, connected by the rim portion 111. Portion 111 has surfaces 112 that conform to oppositely sloped truncated cones and a rounded annular area 113 dimensioned to contact the entrant and cylindrical surface of the sleeve 58. A vent 114 is provided in that side of the annular member faced toward the passage 37. When this shuttle assembly is moved toward sphere launching position, member 105 gradually reduces flow through the interchange as it enters the sleeve portion 59. The member 41 ensures a seal against pressure differential applied from opening 36. This embodiment functions like the embodiment of FIG. 1 to prevent hydraulic shock.

To summarize, the invention provides an effective interchange for meter provers which solves the problem of hydraulic shock when the shuttle assembly is moved between its operating positions. As previously mentioned, elimination of hydraulic shock is advantageous in that it avoids possible injury to other portions of the meter prover or metering system, and avoids deterioration of adjacent pipe connections or couplings to which shock or pressure surges may be transmitted.

While the invention is deemed to be of particular value when incorporated in the interchange of a meter prover, it can be used in apparatus for controlling liquid flow, or so-called flow diverters. Such a diverter is shown in FIG. 9. It consists of a body having flow passages 117, 118 and a cylindrical sleeve 119 mounted between the same. A sealing assembly 121 is carried by the operating rod 122, and consists of resilient sealing members 123 that are oppositely faced and similar to members 41 in configuration. Rod 122 connects with external operating means 124 that is mounted on the body closure 126. The sealing assembly carries a resilient member 127 corresponding to member 67 of FIG. 1. Assuming that passage 117 is the inlet and flow is occurring through sleeve 119 to passage 118, with the sealing assembly retracted to the position shown in dotted lines, when the sealing assembly is moved to the closed position shown in solid lines, member 127 first contacts the entrant surface 128 of sleeve 119 and is then contracted and engaged with the cylindrical sleeve surface, after which a seal is established by entrance of the members 123 within the sleeve. Thus hydraulic shock is prevented in the same manner as with the interchange of FIG. 1. FIG. 9 shows use of a groove 129 in the sleeve 119 to obtain the effect described in connection with FIGS. 5 and 6.

What is claimed is:

1. In meter prover apparatus of the type having a meter prover loop adapted to receive a flow propelled sphere, a hollow interchange body, the body having a first opening through which a sphere may pass from the outlet end of the metering pipe loop into the interior of the body, and a second opening spaced axially from the first opening through which a sphere may pass from the body to the inlet end of the meter prover loop, a shuttle assembly disposed within the body, the assembly including a sphere carrier having a sphere accommodating cavity, the assembly being movable in opposite directions between a first sphere launching position and a second sphere receiving position, the spacing between the centers of the openings in the body corresponding generally to the distance of movement of the shuttle assembly between its operating positions, sealing means for preventing flow through the interchange body when the shuttle assembly is in its launching position, and means preventing hydraulic shock when the shuttle assembly is moved from sphere receiving to launching position, said means serving to reduce backflow before engagement of the sealing means.

2. Apparatus as in claim 1 in which the sealing means consists of a cylindrical sleeve carried within the interchange body and adapted to have sealing engagement with resilient sealing means carried by the shuttle assembly, and in which the means for preventing hydraulic shock consists of a resilient member carried by the shuttle assembly and engageable with said sleeve before said resilient sealing means, when the shuttle assembly is moved from sphere receiving to launching position.

3. Apparatus as in claim 2 in which the sealing means carried by the shuttle assembly consists of two members made of resilient material, each member having a rim of a diameter such that when it is moved within the sleeve the rim is contracted and sealing engagement established, and in which the means for preventing hydraulic shock consists of a resilient member mounted on the shuttle assembly and having a rim which when relaxed is of a diameter greater than the diameter of the sleeve, said rim having a free edge faced toward the said resilient sealing members.

4. Apparatus as in claim 3 in which the shuttle assembly includes flow attentuating or restricting means communicating between the sides of the resilient member that prevents hydraulic shock.

5. Apparatus as in claim 2 in which a sealing means carried by the shuttle assembly consists of one member of resilient material, having a rim with a diameter such that when it is moved in the sleeve the rim is contracted and sealing engagement established, and in which the means for preventing hydraulic shock consists of a resilient member mounted on the shuttle assembly being U-shaped in radial section with a rounded annular area faced toward said sleeve.

6. In an apparatus for controlling flow of liquid, a hollow body having spaced flow passages, a cylindrical sleeve carried by the body and disposed between the flow passages, plunger means within the body disposed in alignment with said sleeve and movable in opposite directions, said plunger means including resilient sealing means adapted to have sealing engagement with the inner cylindrical surface of the sleeve when disposed within the same, said sealing means consisting of two members made of resilient material, each member having a rim of a diameter such that when it is moved within the sleeve the rim is contracted and sealing engagement established, and means for preventing hydraulic shock consisting of a resilient member carried by said plunger means and having a rim which when relaxed is of a diameter greater than the diameter of the sleeve, said rim having a free edge spaced toward the said resilient sealing members.

7. In an apparatus for controlling flow of liquid, a hollow body having spaced flow passages, a cylindrical sleeve carried by the body and disposed between the flow passages, plunger means within the body disposed in alignment with said sleeve and movable in opposite directions, said plunger means including resilient sealing means adapted to have a sealing engagement with the inner cylindrical surface of the sleeve when disposed within the same, said sealing means consisting of one member made of resilient material, having a rim of a diameter such that when it is moved within the sleeve the rim is contracted and sealing engagement established, and means for preventing hydraulic shock consisting of a resilient member carried by said plunger means being U-shaped in radial section with a rounded annular area faced away from said sleeve.

* * * * *